United States Patent
Lopata

(10) Patent No.: US 7,733,064 B2
(45) Date of Patent: Jun. 8, 2010

(54) SOFTWARE BASED THERMAL CHARGING REGULATION LOOP

(75) Inventor: Douglas D. Lopata, Boyertown, PA (US)

(73) Assignee: Agere Systems Inc., Allentown, PA (US)

( * ) Notice: Subject to any disclaimer, the term of this patent is extended or adjusted under 35 U.S.C. 154(b) by 549 days.

(21) Appl. No.: 11/511,607

(22) Filed: Aug. 29, 2006

(65) Prior Publication Data

US 2008/0054853 A1   Mar. 6, 2008

(51) Int. Cl.
*H02J 7/04* (2006.01)
*H02J 7/00* (2006.01)

(52) U.S. Cl. ............................... 320/150; 320/135

(58) Field of Classification Search ........... 320/106, 320/107, 110, 112, 113, 115, 134, 136, 150, 320/152, 153, 135, 151
See application file for complete search history.

(56) References Cited

U.S. PATENT DOCUMENTS

| | | | | |
|---|---|---|---|---|
| 5,339,018 A | * | 8/1994 | Brokaw | 320/147 |
| 5,483,145 A | * | 1/1996 | Shiojima et al. | 320/150 |
| 5,912,547 A | * | 6/1999 | Grabon | 320/150 |
| 5,918,186 A | * | 6/1999 | Liu | 455/572 |
| 5,965,998 A | * | 10/1999 | Whiting et al. | 320/165 |
| 6,100,664 A | * | 8/2000 | Oglesbee et al. | 320/125 |
| 6,373,228 B1 | * | 4/2002 | Sakakibara | 320/150 |
| 2004/0135551 A1 | * | 7/2004 | Hoff et al. | 320/150 |
| 2006/0139009 A1 | * | 6/2006 | So | 320/135 |
| 2007/0126405 A1 | * | 6/2007 | Kao et al. | 320/150 |

* cited by examiner

*Primary Examiner*—Edward Tso
*Assistant Examiner*—M'Baye Diao
(74) *Attorney, Agent, or Firm*—Mendelsohn, Drucker & Associates, P.C.; David L. Cargille; Steve Mendelsohn

(57) ABSTRACT

The present invention implements a software controlled thermal feedback system for battery charging circuitry in portable devices, specifically in cellular telephones. The charging hardware block is integrated into a mixed-signal analog baseband (ABB) circuit. In addition to standard function controls, integrated within the ABB are silicon temperature sensors used to monitor the temperature of any silicon components integrated on the ABB and detect any temperature change due to thermal heating. The temperature value is passed to the digital base band (DBB) circuit. Here, a microcontroller is programmed to perform power management functions relating to the ABB. Thermal control software, implemented on the DBB microcontroller, monitors the silicon temperature of the ABB and adjusts the power levels on the ABB accordingly to provide a controlled chip temperature.

26 Claims, 2 Drawing Sheets

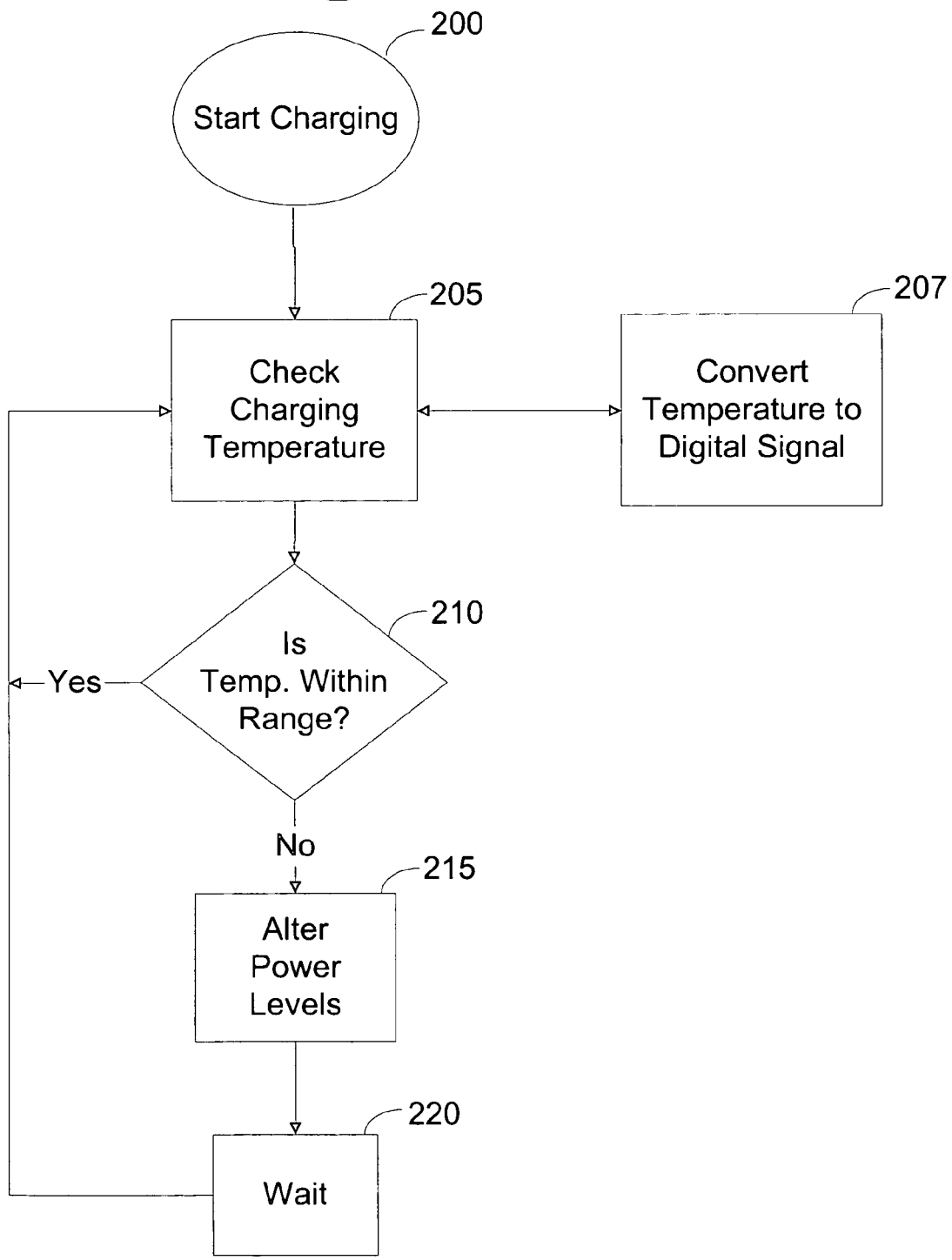

SOFTWARE BASED THERMAL CHARGING REGULATION LOOP

FIELD OF THE INVENTION

The present invention pertains to methods for thermal control of charging circuitry during battery charging, and more specifically, towards thermal control of charging circuitry during cellular telephone battery charging.

BACKGROUND OF THE INVENTION

Technology related to portable devices, specifically cellular telephones, is changing rapidly. Cellular telephones are becoming smaller, yet more powerful. One related technology that is rapidly changing along with the cellular telephone is battery technology and technology related to battery charging. Cellular telephone batteries are becoming smaller and more powerful, and there are multiple battery types that take advantage of different chemical formulations. One problem, however, related to these new generations of batteries is controlling the heat generated during charging, i.e., thermal control. During charging, a charger with a built-in pass transistor can become dangerously hot and the pass transistor can become damaged. In addition, if the heat is unregulated, the heat can damage internal parts of the cellular telephone or damage the battery itself. Fuel cells can rupture, completely destroying the battery, or the cellular telephone itself.

Several hardware approaches to thermal control have been attempted recently to regulate battery charging. These approaches are based on an integrated hardware control loop that regulates battery charging circuitry temperature during charging. One such approach is a 2-point hysteretic approach. In this approach, hardwired circuitry provides an upper temperature limit that is considered safe during charging, and if the upper temperature limit is reached, the charging process is either stopped or reduced to a lower charging rate until a lower temperature limit is reached. Once the lower temperature limit is reached, the charging rate returns to a normal level. This process repeats continuously, toggling back and forth dependent on the temperature of the charging circuitry.

Another approach is a hardwired thermal control loop providing continuous temperature feedback to a controller monitoring the charging circuitry temperature. This approach constantly measures the temperature of the charging circuitry, and adjusts charging power levels in a continuous-time analog or discrete time digital manner until a steady state temperature is reached.

A third approach involves a complete shutdown of the charging circuitry. Utilizing a temperature sensor, the temperature of the charging circuitry is monitored and if the temperature reaches a point above an acceptable temperature limit, the charging power is completely shut off until the charging circuitry temperature reaches a level at which it is considered safe to continue with charging. This approach, called a "duty-cycled power" approach, allows the charging current to be completely turned off for a percentage of the operating period and can also be combined with a decreased charging current approach to implement a flexible charging power scheme that effectively controls circuit heating.

These approaches all have drawbacks. Each approach involves hardwired circuitry, which provides less programmability, and thus results in a less flexible charging method. Due to the hardwiring, it is nearly impossible to build in flexible algorithms to monitor circuitry temperature and optimize battery charging currents and battery charging power.

What is needed is a software based temperature control for monitoring charging circuitry temperature and controlling charging rates to maintain an optimal temperature while still maintaining a high charging rate. Utilizing software control, the above mentioned problems, mainly lack of programmability and flexibility are resolved.

SUMMARY OF THE INVENTION

The present invention implements a software controlled thermal feedback system for battery charging circuitry in portable devices, specifically in cellular telephones. This software controlled charging circuitry allows for a more flexible thermal control system providing upgradeable capabilities built into the software, allowing for thermal control of additional hardware systems.

The system includes an integrated battery charging hardware block. In the present invention, the charging hardware block is integrated into a mixed-signal analog base-band (ABB) circuit. However, this charging hardware block can generate significant on-chip thermal heating that could result in a significant increase in the temperature of the chip, possibly damaging onboard silicon components.

The ABB contains standard functional controllers for cellular telephone functions, such as LED controls, speaker and microphone controls, and LCD screen controls. In addition to the standard function controls, integrated within the ABB is a silicon temperature sensor used to monitor the temperature of any silicon components integrated on the ABB and detect any temperature change due to thermal heating, such as the heating produced by the charging hardware block. Also integrated onto the ABB is an Analog/Digital converter (A/D) for converting the thermal sensor output voltage into a digital value. This digital value is passed over a serial interface to the digital base band (DBB) circuit, where the cellular telephone's microcontroller is integrated. In the present invention, the microcontroller is further programmed to perform power management functions relating to the ABB.

Thermal control software, implemented on the DBB microcontroller, monitors the silicon temperature of the ABB and adjusts the charging current accordingly to provide a controlled chip temperature during charging. Additionally, since ABB dynamic power is a function of many activities, not relegated to only charging, but to the other functions listed above (e.g., LED control, LCD screen control), the thermal temperature monitoring of the present invention allows for tuning and optimization of the power levels of other functions being controlled by the ABB, providing a higher level of capability to customize the thermal control. By monitoring and adjusting the power levels of other functions controlled by the ABB, the system can keep battery charging power maximized and battery charging time minimized.

The exact nature of the software based digital control loop can be tuned and programmed to optimize the charging/temperature algorithm such that the charging circuitry can be used in other platforms, not limiting the system to cellular telephones.

BRIEF DESCRIPTION OF THE DRAWINGS

FIG. 2 is a flow chart of a method for charging a battery in a portable device incorporating principles of the present invention.

DETAILED DESCRIPTION OF THE INVENTION

Figure 1:
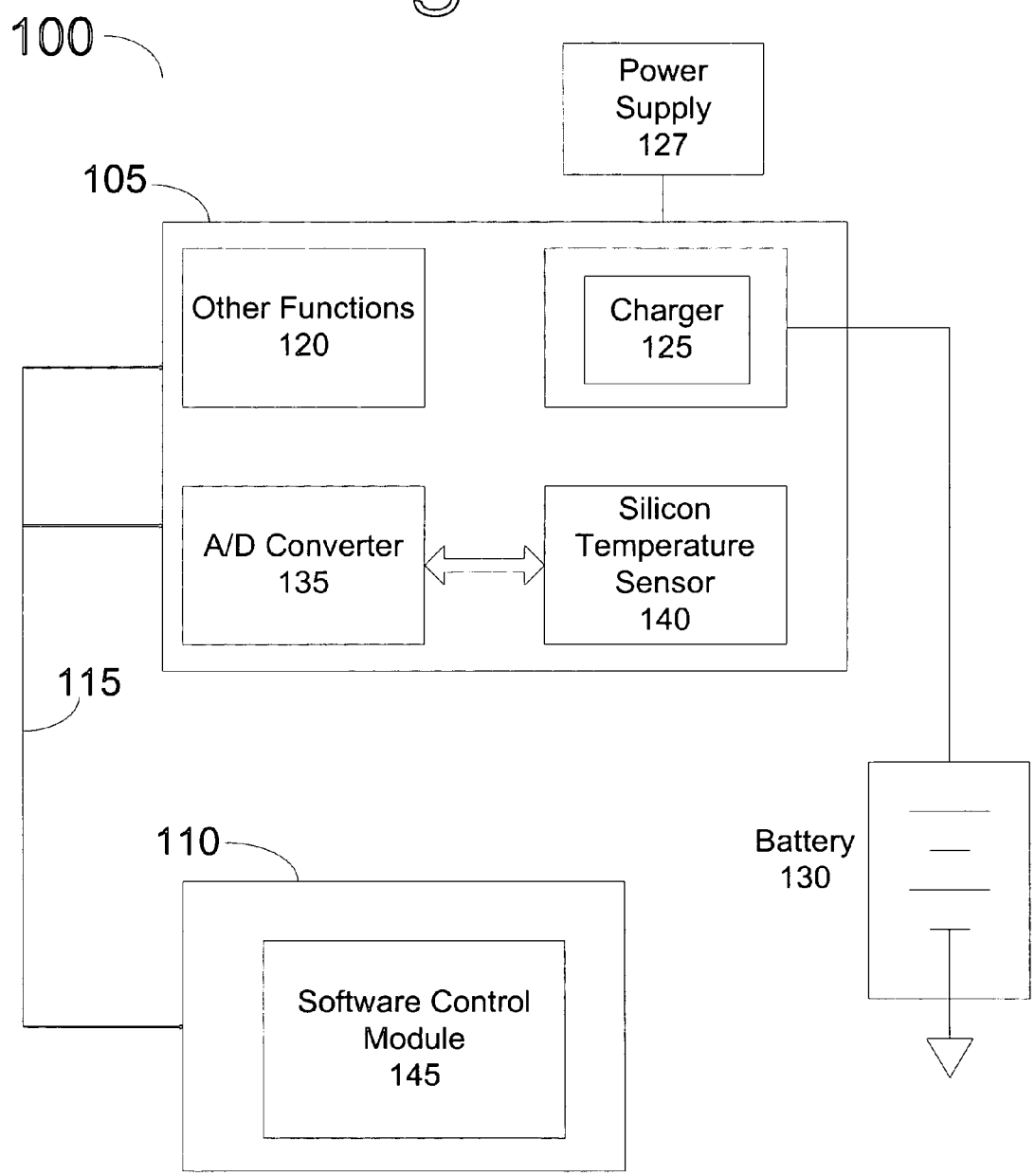
FIG. 1 is a block diagram of a portable device circuit incorporating principles of the present invention.

Portable devices, such as cellular telephones and personal digital assistants (PDAs) have become more popular in the past few years. Many of these portable devices now come with an integrated rechargeable battery, eliminating the need for buying replacement batteries. However, as portable devices have become more powerful, so too have their batteries. These more powerful batteries require more power to charge, which can cause the charging circuitry to radiate thermal heat throughout the portable device. This heat can cause the internal circuitry of the portable device, for example a cellular telephone, to become damaged or cause performance degradation of any thermally sensitive components in the cellular telephone. The present invention utilizes a software controlled thermal temperature control to maintain a safe temperature during battery charging.

FIG. 1 illustrates a portable device circuit 100 for use in a cellular telephone. In the circuit, the analog base band circuit (ABB) 105 is operably connected to the digital base band circuit (DBB) 110 through serial interface 115. Serial interface 115 is a standard serial interface, used to transfer standard control commands in the power management system, as well as charging control commands in the present invention.

Integrated on ABB 105 are many hardware modules built to perform various functions. Grouped together is block 120, which contains all other functions not vital to the charging circuitry (e.g., keypad LED controls, LCD screen controls, speaker and microphone controls). Also integrated on the ABB is charger 125. Charger 125 has a discrete set of selectable charging currents that can be selected based upon battery capacity, desired charging rate, and safety considerations (e.g., thermal temperature being produced). An exemplary range of charging current settings would span 50 mA to 1000 mA with anywhere between 8 to 16 total discrete selections in this range. Once set to a desired charging rate, charger 125 controls the power output to rechargeable battery 130. Also operably connected to charger 125 is power supply 127.

Analog/Digital (A/D) converter 135 is operably connected to a silicon temperature sensor 140. Sensor 140 is used to monitor the temperature of the silicon components onboard ABB 105 during charging. As battery 130 is charged, charger 125 emits thermal heat, which if unregulated will result in damage to circuit components. Sensor 140 outputs a voltage signal that is converted at the A/D converter 135 into a digital value. This digital value is passed via serial interface 115 to DBB 110, where software control module 145, which is integrated into a standard cellular telephone microcontroller, will process the thermal temperature data and monitor the temperature of the charging circuitry. It should be clear to persons familiar with the related arts that the software control module can be any circuitry programmed to perform the processes, procedures and/or steps described herein. This circuitry can include, but is not limited to, application-specific integrated circuits, logic circuits, and state machines. If the data sent from sensor 140 indicates the temperature is too high, control module 145 send instructions to ABB 105 to lower selected power levels, for example, by instructing the charger 125 to reduce the amount of power being sent to the battery until a safe temperature is reached or by instructing the charger to turn off and on with a duty cycle that decreases the average power dissipation to a level that meets a desired temperature level on the ABB. As a complementary approach to power reduction, the software control loop can change the power dissipation of other elements in the system, typically on the ABB, allowing the battery charging current to be maintained and minimizing/optimizing the total charging time while controlling heat in the ABB and the whole system. In addition, although only one thermal sensor is shown in FIG. 1, this is shown by way of example only, and is not meant to limit the present invention. Multiple sensors can be embedded in multiple regions of the ABB to allow localized thermal temperature control. The A/D converter can be used to monitor each of the thermal sensor values and convert them to digital values for use by the charging control module. The full functionality of the system is explained below with respect to FIG. 2.

FIG. 2 is a flow chart illustrating a method for charging a battery utilizing the circuit discussed in FIG. 1, while utilizing principles of the present invention to alter the power levels of charger 125 to maintain a safe thermal temperature on the ABB 105 circuit. First, the battery charging is initiated in step 200. During the charging process, control module 145 instructs the silicon temperature sensor 140 to check the temperature of the circuitry in step 205. In step 207, A/D converter 135 converts the voltage output of sensor 140 to a digital signal, and returns the digital signal to control module 145.

Once control module 145 receives the converted digital temperature signal, the process continues to step 210 where the control module must determine if the temperature of the ABB is within an accepted range. One example of an accepted temperature range for the ABB is 110-115° C. If the temperature of the ABB falls within the accepted temperature range, the process returns back to step 205 where the temperature is again checked. However, if the temperature falls outside of the accepted temperature range, the process continues to step 215.

In step 215, the microcontroller instructs various components on the ABB to lower their power levels. In one instance, the microcontroller instructs the battery charger to lower the charging power being used. If the temperature exceeds the maximum ABB operating temperature range, the software selects a lower battery charging power or a lower on/off duty cycle and reprograms the battery charger. Conversely, if the ABB temperature is below the minimum charging temperature trip point (i.e., below the maximum ABB operating temperature range discussed above), the software increases the charging power being provided to the battery, and reprograms the battery charger to operate at the new settings.

After altering the performance of the battery charger, which in effect alters the power being supplied to the battery for recharging, the process proceeds to step 220 where the microcontroller waits a small period of time, for example approximately 500 milliseconds, for the changes to the programming of the charger. Once the wait time is elapsed, the process continues back to step 205 where the ABB temperature is once again checked. This process continues until the battery is fully charged, or until a power supply to the charging circuit is disconnected.

Having thus described a particular embodiment of the invention, various alterations, modifications, and improvements will readily occur to those skilled in the art. One example of a modification would be to alter the power provided to other functions on the ABB during charging of the battery so as to not disrupt the level of power being supplied from the charger to the battery. For example, the output power supplied to the LCD screen of the cellular telephone could be lowered, resulting in a dimmer screen. The trade-off though, is the charging power level remains unaltered. Similar power reductions can be made with respect to the speaker, microphone, LEDs, or any other functions the ABB circuit controls. This capability is not possible in existing chargers with hardwired charger controls, and exemplifies the flexibility the present invention provides over the known prior art.

Additional alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method for providing temperature control for integrated circuit components including battery charger circuitry, the method comprising the following steps:
   (1) measuring the temperature of said integrated circuit components with one or more temperature sensors;
   (2) generating a digital signal corresponding to said measured temperature;
   (3) monitoring said digital signal at a software control module; and
   (4) adjusting a charging power level at said battery charger circuitry as a function of said measured temperature, wherein steps (1) through (4) are repeated until said measured temperature of said integrated circuit components falls within a predetermined acceptable range.

2. The method of claim 1, wherein said integrated circuit components and said battery charger circuitry are integrated in an analog base band circuit (ABB) of a cellular telephone.

3. The method of claim 2 wherein said temperature sensors are embedded in said ABB to monitor temperatures of silicon components integrated into said ABB.

4. The method of claim 3, where said software control module is integrated in a digital base band circuit (DBB) of a cellular telephone.

5. The method of claim 4, wherein said ABB and DBB are operably connected via a serial interface.

6. The method of claim 5, wherein said software control module is integrated into a microcontroller of said cellular telephone.

7. The method of claim 1, wherein said predetermined acceptable range of temperatures is between 110 and 115 degrees Celsius.

8. A system for monitoring and controlling thermal temperature in integrated circuit components, the system comprising:
   one or more temperature sensors for measuring a temperature of said integrated circuit components;
      a converter operably connected to said one or more temperature sensors, said converter programmed to convert said measured temperature to a digital signal; and
      a software control module operably connected to said converter, said module programmed to monitor said measured temperature and adjust a power level of one or more of said integrated circuit components as a function of said measured temperature, wherein:
      said one or more of said integrated circuit components include battery charging circuitry;
      said software control module is further programmed to control said battery charging circuitry;
      said software control module is further programmed to adjust a charging level said battery charging circuitry is set to, thereby altering the thermal heat production of said battery charging circuitry; and
      said integrated circuit components are integrated in an analog base band circuit (ABB) of a cellular telephone.

9. The system of claim 8 wherein said temperature sensors are embedded in said ABB to monitor temperatures of silicon components integrated into said ABB.

10. The system of claim 9, wherein said software control module is integrated in a digital base band circuit (DBB) of a cellular telephone.

11. The system of claim 10, wherein said ABB and said DBB are operably connected via a serial interface.

12. The system of claim 11, wherein said software control module is integrated into a microcontroller of said cellular telephone.

13. A method for providing temperature control for integrated circuit components, the method comprising the following steps:
   (1) measuring the temperature of said integrated circuit components with one or more temperature sensors;
   (2) generating a digital signal corresponding to said measured temperature;
   (3) monitoring said digital signal at a software control module; and
   (4) adjusting at least one power level at one or more select integrated circuit components as a function of said measured temperature, wherein said steps (1) through (4) are repeated until said obtained temperature of said integrated circuit components falls within a predetermined acceptable range.

14. The method of claim 13, wherein said circuit components and said battery charger are integrated in an analog base band circuit (ABB) of a cellular telephone.

15. The method of claim 14, wherein said software control module is integrated in a digital base band circuit (DBB) of a cellular telephone.

16. The system of claim 15, wherein said software control module is integrated into a microcontroller of said cellular telephone.

17. The system of claim 13, wherein said predetermined acceptable range of temperatures is between 110 and 115 degrees Celsius.

18. The method of claim 13, wherein said one or more select integrated circuit components comprise at least one of keypad LED controls, LCD screen controls, speaker controls and microphone controls.

19. An apparatus for providing temperature control, said apparatus comprising:
   means for measuring a temperature of integrated circuit components;
   means for monitoring a digital signal corresponding to said measured temperature; and
   means for adjusting a charging power and operation of alternate functions of said integrated circuit components as a function of said measured temperature.

20. The apparatus of claim 19, wherein said integrated circuit components are integrated into a cellular telephone.

21. The system of claim 8, wherein the charging level is adjusted until the temperature of said integrated circuit components falls within a predetermined acceptable range.

22. The method of claim 1, wherein adjusting a charging power level at said battery charger circuitry as a function of said measured temperature comprises adjusting a duty cycle of said battery charger circuitry.

23. The method of claim 1, wherein, when said measured temperature is below a predetermined minimum charging temperature, the charging power level at said battery charger circuitry is increased.

24. The system of claim 8, wherein said software control module is programmed to adjust the charging power level at said battery charger circuitry by adjusting a duty cycle of said battery charger circuitry.

25. The system of claim 8, wherein the software control module is programmed to increase the charging power level at said battery charger circuitry, when said measured temperature is below a predetermined minimum charging temperature.

26. The method of claim 13, wherein, when said measured temperature is below a predetermined minimum charging temperature, the at least one power level at said one or more select integrated circuit components is increased.

* * * * *